United States Patent [19]

Bardoliwalla et al.

[11] Patent Number: 4,599,372

[45] Date of Patent: Jul. 8, 1986

[54] SELF-INVERTING WATER-IN-OIL POLYMER EMULSIONS HAVING LOW POUR POINT TEMPERATURES

[75] Inventors: Dinshaw F. Bardoliwalla, Randolph; Reuben H. Grinstein, Denville, both of N.J.

[73] Assignee: Diamond Shamrock Chemicals Company, Dallas, Tex.

[21] Appl. No.: 516,535

[22] Filed: Jul. 25, 1983

[51] Int. Cl.$^4$ .................. C08L 33/02; C08L 33/26
[52] U.S. Cl. .................. 523/336; 524/377; 524/388; 524/376; 524/386
[58] Field of Search ............... 523/336; 524/377, 388, 524/376, 386

[56] References Cited

U.S. PATENT DOCUMENTS 3,284,393 11/1966 Vanderhoff et al. .
4,022,731 5/1977 Schmitt .
4,022,736 5/1977 Schmitt .
4,077,930 3/1978 Lim et al. .
4,435,528 3/1984 Domina ........................ 523/336

FOREIGN PATENT DOCUMENTS 814128 1/1982 South Africa .

Primary Examiner—Morton Foelak
Assistant Examiner—M. L. Moore
Attorney, Agent, or Firm—Leslie G. Nunn, Jr.

[57] ABSTRACT

A self-inverting water-in-oil polymer emulsion having a low pour point is prepared by adding a pour point depressant, diol and triol in amounts effective to lower the pour point and inhibit skin formation on the emulsion. The emulsion may be prepared by adding a mixture of from about 0.05 to about 0.5 parts by weight of pour point depressant, from about 5.0 to about 100.0 parts by weight of diol and from about 5.0 to about 100.0 parts by weight of triol to 1.0 to 100.0 parts by weight of a self-inverting water-in-oil polymer emulsion.

11 Claims, No Drawings

4,599,372

SELF-INVERTING WATER-IN-OIL POLYMER EMULSIONS HAVING LOW POUR POINT TEMPERATURES

BACKGROUND OF THE INVENTION

1. Field of the Invention

This invention relates to self-inverting water-in-oil polymer emulsions having low pour point temperatures for use in industrial water treatment, waste water treatment, sludge conditioning, ore dressing, papermaking, secondary and tertiary oil recovery.

2. Description of the Prior Art

Water-in-oil self-inverting polymer emulsions are used in commercial applications such as industrial water treatment, waste water treatment, sludge conditioning, ore dressing, papermaking, secondary and tertiary oil recovery.

Three types of polymer emulsions, i.e., nonionic, cationic and anionic emulsions are known. Preparation of these emulsions is described in numerous patents. The internal phase of the emulsion is formed from a water solution of an ethylenic unsaturated monomer or comonomer such as (1) acrylamide, methacrylamide, (2) acrylic acid, methacrylic acid, (3) dimethylaminoethyl methacrylate, diethylaminoethyl methacrylate, dimethyl and diethylaminoethyl acrylate, allyl methacrylate and its quaternization products, (4) N-substituted methacrylamide and (5) vinyl sulfonate.

The external phase of the emulsion is formed using low HLB emulsifiers such as mono and diglycerides of fatty acids, sorbitan fatty acid monoesters, polyoxyethylene alcohols and the like dissolved in a solvent such as kerosene, xylene, toluene and chlorinated hydrocarbons.

A water-in-oil emulsion is produced by slowly adding the water phase to the oil phase under rapid agitation. The emulsion is homogenized to obtain the proper particle size and is then polymerized by one of the procedures described in the literature. After polymerization is completed, the final step is the incorporation of an inverting agent, a high HLB surfactant, into the emulsion. The finished emulsion is uniform and disperses instantly by self-inversion in a water system. Water-in-oil emulsions and their uses have been described in the prior art. The following patents are representative of the prior art.

U.S. Pat. No. 3,284,393—Vanderhoff et al, issued Nov. 8, 1966, describes polymerization of vinyl monomer in the oil phase by forming a water-in-oil emulsion of the monomer in a hydrophobic liquid and water with a water-in-oil emulsifier and then polymerizing the emulsion with a free radical catalyst to obtain a polymeric latex where the oil phase is the dispersion medium.

U.S. Pat. No. 4,022,731—Schmitt, issued May 10, 1977, describes a self-inverting water-in-oil emulsion containing an acrylamide polymer in the aqueous phase, hydrocarbon oil, water-in-oil emulsifier and an inverting surfactant mixture containing two sulfosuccinates or one sulfosuccinate and an alkylphenol ethoxylate.

U.S. Pat. No. 4,022,736—Schmitt, issued May 10, 1977, describes a self-inverting water-in-oil emulsion having a copolymer of acrylic acid in the aqueous phase, hydrocarbon oil, water-in-oil emulsifier and an inverting surfactant which is a fatty alcohol ethoxylate.

U.S. Pat. No. 4,077,930—Lim et al, issued Mar. 7, 1978, describes a stable, self-inverting water-in-oil emulsion obtained by emulsifying water soluble vinyl monomer in oil containing at least 20% emulsifier and a free radical catalyst and then polymerizing to obtain a stable polymer emulsion which can be inverted by adding water without any other reagent.

Polymeric flooding in oil recovery operations where polyelectrolytes are added to the flood water has become of greater importance because it provides improved oil recovery in secondary and tertiary operations from petroleum reservoirs.

In the temperate zone, use of self-inverting water-in-oil polymer emulsion systems having pour points above or close to 0° C. do not present problems. However, under arctic conditions, when the same emulsion systems are cooled below 0° C., a thick frozen skin forms initially and the system gradually freezes completely. When these emulsions are transported under heated conditions to remote locations, their performance deteriorates rapidly.

Where a wax bearing oil is cooled below its cloud point, wax precipitates and the oil becomes cloudy. When cooling is continued and the wax bearing oil cooled below its pour point, i.e., the lowest temperature at which the oil will still flow, sufficient wax precipitates to gel the oil and to render the oil no longer flowable or usable for its intended purpose.

Certain additives known as pour point depressants can be added in small amounts to wax bearing oils to depress their pour points. Pour point depressants alter the nature of crystals precipitating from the oil as well as inhibit the tendency of wax crystals to interlock and form a gel. These additives not only arrest crystal growth but also destroy cohesive forces between crystals. Pour point depressants have been used extensively to enhance lubricating oil properties. Further information on the use of pour point depressants in lubricating oils may be found on pages 168 through 178 of V. A. Kalichevsky's Modern Methods of Refining Lubricating Oils—(Reinhold Publishing Corporation, N.Y., N.Y., 1938).

South African Pat. No. 81/4128—Lipowski et al, issued to Diamond Shamrock Corporation describes self-inverting water-in-oil emulsions having low temperature pour points prepared by adding pour point depressants and polyols in amounts effective to lower the pour point and inhibit skin formation on emulsions.

SUMMARY OF THE INVENTION

A self-inverting water-in-oil polymeric emulsion having a low pour point is prepared by adding (a) a pour point depressant, (b) a diol and (c) a triol in amounts effective to lower the pour point of the emulsion and to inhibit skin formation on the emulsion surface at low temperatures of from about −5° to about −50° C. The self-inverting emulsion may be a water-in-oil nonionic polymer emulsion, water-in-oil cationic polymer emulsion,
water-in-oil anionic copolymer emulsion,
water-in-oil anionic hydrolyzed polymer emulsion, or
water-in-oil amphoteric polymer emulsion
containing (a) a pour point depressant, (b) a diol or diol mixture and (c) a triol or triol mixtures. This emulsion may be prepared by adding from about 0.05 to about 0.5 parts by weight of pour point depressant, from about 5.0 to about 100.0 parts by weight of diol and from about 5.0 to about 100.0 parts by weight of triol to 1.0 to 100.0 parts by weight of a self-inverting water-in-oil polymer emulsion containing from about 10.0 to about 50.0% by weight of polymer, from about 10.0 to about 40.0% by weight of oil and water being the balance of the emulsion.

DETAILED DESCRIPTION

There are many potential industrial applications for self-inverting water-in-oil polymer emulsions in industrial water treatment, waste water treatment, sludge conditioning, ore dressing, papermaking, secondary and tertiary oil recovery. Water flooding with polymers where polyelectrolytes are introduced into oil recovery flood waters has become important since polymer floods have given higher yields of oil in secondary and tertiary recovery operations.

If the emulsion has a pour point above or close to 0° C., use of a self-inverting water-in-oil polymer emulsion is not a problem in moderate climates. However, the pour point of an emulsion is critical under arctic conditions where the emulsion has to withstand as low temperature as possible and still be in a pourable condition. When a water-in-oil polymer emulsion is cooled below 0° C., a thick frozen skin forms on the surface of the emulsion and the emulsion gradually freezes solid. When a heated emulsion is transported to a remote location during cold weather operations, performance of the emulsion rapidly deteriorates.

An emulsion, which has a low pour point and does not form a thick frozen skin on cooling below 0° C., has been discovered. This emulsion is prepared by adding sufficient pour point depressant, diol or diol mixture and triol or triol mixture to a self-inverting water-in-oil polymer emulsion to lower the pour point of the emulsion and to inhibit skin formation on the surface of the emulsion. The preferred procedure involves mixing the pour point depressant with the diol or diol mixture and triol or triol mixture and then blending the resulting mixture with the self-inverting water-in-oil polymer emulsion. A self-inverting emulsion such as a water-in-oil nonionic polymer emulsion, water-in-oil cationic polymer emulsion, water-in-oil anionic copolymer emulsion, water-in-oil anionic hydrolyzed polymer emulsion, water-in-oil amphoteric polymer water-in-oil emulsion or the like may be used in the practice of this invention.

An emulsion having a low pour point can be prepared by adding a mixture containing from about 0.05 to about 0.5 parts by weight of pour point depressant, from about 5.0 to about 100.0 parts by weight of diol and from about 5.0 to about 100.0 parts by weight of triol or triol mixture to 1.0 to 100.0 parts by weight of a self-inverting water-in-oil polymer emulsion containing from about 10.0 to about 50.0% by weight of polymer and from about 10.0 to about 40.0% by weight of oil with water representing the balance of the emulsion with the preferred mixture containing from about 0.05 to about 0.5 parts by weight of pour point depressant, from about 5.0 to about 20 parts by weight of diol and from about 5.0 to about 20 parts by weight of triol to 100.0 parts by weight of the emulsion.

The water/oil ratio in the emulsion determines the quantities of pour point depressant, diol and triol required. It has been found that a self-inverting water-in-oil polymer emulsion does not respond to a pour point depressant in the same manner as a lubricating oil and that a mixture of pour point depressant, diol and triol should be added. These mixtures should be prepared on a small scale initially because some mixtures may be prone to gelation.

For practical purposes, the pour point of an oil is the lowest temperature at which the oil will pour or flow when chilled without stirring under a prescribed temperature sequence and chilling rate. A pour point depressant is an organic chemical which, when added (in concentrations up to 1 percent) to a paraffinic or waxy oil of high natural pour point, will lower the pour point by as much as 60° F.

As paraffinic oil is cooled to temperatures approaching the natural pour point, waxy constituents in the oil solidify in large crystals, forming an interlacing matrix. In effect, the wax structure traps and holds the oil as a honeycomb holds honey. The pour point depressant is adsorbed on the wax crystals as they begin to form, limiting the size of the crystals and retarding the formation of the "honeycomb" structure. It is believed that a pour point depressant not only functions by arresting wax crystal growth but destroys cohesive forces between crystals. Thus, although the wax is still present, it does not stop the oil flow until much lower temperatures are reached.

Even though a pour point depressant may lower the temperature at which the oil will no longer flow, wax crystallization may occur at a point above the pour point, i.e., at the cloud point, the point the oil becomes cloudy because of wax crystallization. The cloud point is usually not affected by the flow improver.

Small size wax crystals are desirable because they do not clog the fine mesh screens in oil transportation, storage, and handling equipment. Pour point depressants which change wax crystals to more advantageous sizes and shapes are known as flow improvers. It is desirable not only to produce oils with low pour points but also oils that form small wax crystals so that clogging of filters does not occur and impair oil flow at low operating temperatures. The upper temperature limit at which wax crystals separate from middle distillate petroleum fuels may vary from −50° F. for turbojet fuels to 30° F. for summer grade number 2 fuel oils.

Pour point depressants offer advantages in paraffinic oils that are pumped, dispensed, or used at temperatures below their natural pour points. The largest use for pour point depressants is in paraffinic-type motor oils. Pour point depressants are also effective for controlling the dilute pour point of reciprocating aviation engine oils. Reductions in pour point are obtained by the use of pour point depressants, thus avoiding additional costly dewaxing by further refining. Ordinarily these additives do not affect the natural cloud point of the base stock or its low-temperature filterability.

The pour point test generally used is the ASTM standard method of test for pour point (ANSI/STM D97-66). The temperature sequence prescribed in this test usually calls for heating the oil to 115° F. (46° C.), followed by relatively rapid cooling in a bath kept 20° to 50° F. below the test sample temperature until solidification occurs. The pour point is arbitrarily placed at the nearest 5° F. above the solid point. This "ASTM pour point" is a true measure of the minimum flow temperature of an oil only when that oil has been exposed to the particular temperature sequence and cooling rate used in the ASTM procedure. Other temperature sequences and cooling rates may result in either higher or lower pour points. This is especially true of oils containing pour depressants.

In recent years, pour point depressants or flow improving additives have been of great assistance in improving performance of oil at low temperatures. Although these additives do not prevent wax separation at lower temperatures, they modify the structure of wax crystals to such a degree that wax-cloudy oils perform satisfactorily.

Useful flow improvers and pour depressants include
Ethylene-based polymers such as:
vinyl ester copolymer
vinyl acetate copolymer and fatty acrylate homopolymer
vinyl ester copolymer and ethylene-alpha-olefin copolymer
alkyl fumarate copolymer
alpha-monoolefin copolymer
ethylene-propylene 1,4-hexadiene terpolymer
oxidized ethylene-propylene-dicyclopentadiene terpolymer
aryl-substituted polyolefin
Other polymeric additives such as:
hydrogenated styrene-butadiene terminated with polar groups
esters of styrene-maleic anhydride copolymer
alkyl itaconate-maleic anhydride copolymer
vinyl acetate-alkyl fumarate copolymer
mixed thiolacrylic esters-aminomethacrylate terpolymer, and
Other additives such as:
polysaccharide
N,N-dialkylricinoleamide
fatty amide and salt
fatty ester of alpha-methylglucoside
olefin-alkyl halide reaction product.
Alkyl methacrylate polymers and copolymers thereof, α-olefin polymers and copolymers thereof, vinyl ester polymers and copolymers thereof, and alkylated polystyrene are particularly useful pour point depressants.

The following commercial pour point depressants may be used in the practice of this invention.

Paraflow ®46 is a balanced combination of pour point depressant and pour point stabilizing components.

Paraflow ®125 is a hydrocarbon wax-naphthalene condensate of the Friedel-Crafts type.

Paraflow ®349 is a balanced combination of pour point depressant and pour point stabilizing components.

The following diol and diol mixtures may be used in the practice of this invention.

| Glycols | |
|---|---|
| ethylene glycol | tripropylene glycol |
| diethylene glycol | polypropylene glycol |
| triethylene glycol | hexylene glycol |
| tetraethylene glycol | 2-ethyl-1,3-hexanediol |
| propylene glycol | 1,5-pentanediol |
| dipropylene glycol | thiodiglycol |
| Ethers of Glycols | |
| methyl Cellosolve ® | butyl Carbitol ® |
| butyl Cellosolve ® | hexyl Carbitol ® |
| hexyl Cellosolve ® | butoxytriethyleneglycol |
| methyl Carbitol ® | methoxytriethyleneglycol |

Ethylene glycol, diethylene glycol, propylene glycol and their mixtures with higher diols or the like are preferred. Ethers of glycol should be used in lower concentrations. High molecular weight polyalkylene glycol ethers such as Pluracol V-7 of BASF Wyandotte Corporation alone or in blends with other diols gives good results.

The following triols (glycerols) and triol (glycerol) mixtures may be used in the practice of this invention.

Trihydric Alcohols glycerol(1,2,3 propanetriol)
1,2,4-butanetriol(1,2,4-trihydroxybutane)
pentaglycerol(2-hydroxymethyl-2-methyl-1,3-propanediol or trimethylol ethane)
hexaglycerol(2-ethyl-2-hydroxymethyl-1,3-propanediol or trimethylol propane)
1,2,6-hexanetriol(1,2,6-trihydroxyhexane)

Ethers of Trihydric Alcohols monoethers of trihydric alcohols
diethers of trihydric alcohols
triethers of trihydric alcohols
The above ethers may be prepared by reaction of any of the above trihydric alcohols with aliphatic alcohols such as methanol, ethanol, propanol and the like; alkylene oxides such as ethylene oxide, propylene oxide or the like; glycidal, epichlorohydrin or the like or with itself to obtain polyglycerols.

The self-inverting water-in-oil polymer emulsion having a low pour point temperature produced by this invention is useful in secondary and tertiary recovery of petroleum by water flooding when an effective amount of the nonionic, cationic, anionic, amphoteric polymer emulsion or a mixture of these emulsions is added to the water flood to improve recovery of petroleum. From about 0.005% to about 1.0% by weight of the emulsion may be added based on the weight of water in the flood.

In treatment of sewage and industrial waste, addition of an effective amount of the polymer emulsion to aqueous waste improves flocculation of suspended solids in aqueous suspension. From about 0.01% to about 0.5% by weight of the emulsion may be added based on the weight of the suspension.

In treatment of drilling muds for use in petroleum exploitation, an effective amount of the polymer emulsion is added to control viscosity of the mud during drilling. The emulsion may be used to reduce or increase viscosity of the mud. From about 0.01% to about 1.0% by weight of the emulsion based on the weight of mud may be added.

In pulp and papermaking processes, addition of an effective amount of the polymer emulsion to the pulp improves drainage of the pulp. From about 0.005% to about 0.5% by weight of emulsion based on the weight of dry pulp may be added.

In sludge conditioning processes, addition of an effective amount of the polymer emulsion either by itself or in a mixture with a polyamine condensation product is very efficient in sludge dewatering.

These low pour point emulsions can be handled, stored and used at lower temperatures than conventional emulsions. Further, the handling and transporting of heated emulsions is avoided.

For a fuller understanding of the nature and advantages of this invention, reference may be made to the following examples. These examples are given merely to illustrate the invention and are not to be construed in a limiting sense. All quantities, proportions and percentages are by weight and all references to temperature are °C. unless otherwise indicated. The designation pbw is used to show parts by weight.

EXAMPLE I

Nonionic Polymer Water-In-Oil Emulsion 650 pbw (parts by weight) of a 38.2% acrylamide water solution containing 0.15 m mole persulfate was added slowly with rapid agitation to a solution of 34 pbw mixture of sorbitan monooleate/Polysorbate 80 in 250 pbw kerosene at room temperature. The resulting emulsion was homogenized and transferred to a polymerization vessel. After sparging for one hour with nitrogen, a total of 0.2 m mole sodium metabisulfite was added over a two–three hour period maintaining reaction temperature at 35°–40° C. At the end of this period the polymerization was complete (no exothermic reaction). 36 pbw of ethoxylated nonyl phenol was added and the reaction mixture was agitated for an additional one-half hour. A sample of the resulting reaction mixture when added to large amounts of water inverted instantly forming a thick nonionic polymer aqueous solution.

EXAMPLE II

Cationic Polymer Water-In-Oil Emulsion 591 pbw of a 39.2% acrylamide solution and 61 pbw of a triethylammonium ethyl methacrylate methosulfate salt which was an 80% water solution were mixed together and added slowly under rapid agitation at room temperature to a solution of 44 pbw glyceryl monooleate, 14 pbw PEG-400 monooleate in 249 pbw kerosene. The resulting emulsion was homogenized, transferred to a polymerization vessel and sparged for one hour with nitrogen. Then 0.35 pbw of 2,2'-azo(bis)isobutyronitrile in 2 pbw acetone were added and the mixture was heated to 40° C. After three hours at 40° C., the mixture was heated to 45° C. and the exotherm was controlled with cooling to reach a maximum temperature of 55° C. Then 36 pbw of ethoxylated nonyl phenol was added and stirred until uniform. A sample of the resulting reaction product inverted instantly when added to water to form a cationic aqueous solution.

EXAMPLE III

Anionic Copolymer Water-in-Oil Emulsion 628 pbw of a 37.8% acrylamide, 13 pbw acrylic acid, 13 pbw of 50% by weight sodium hydroxide and 0.11 m mole persulfate were mixed together. The pH of the mixture was 6.0. The solution was added slowly under rapid agitation to a solution of 34 pbw mixture of sorbitan monooleate/Polysorbate 80 in 250 pbw kerosene at room temperature. The resulting emulsion was homogenized and transferred to a polymerization vessel. After sparging for one hour with nitrogen, a total of 0.2 m mole sodium metabisulfite was added over two–three hours maintaining reaction temperature between 35°–40° C. At the end of this period the polymerization was complete (no exothermic reaction). 36 pbw of ethoxylated nonyl phenol was added and the reaction mixture was agitated for an additional one-half hour. A sample of the resulting mixture when added to a large amount of water inverted instantly forming a thick anionic polymer aqueous solution.

EXAMPLE IV

Anionic Copolymer Water-In-Oil Emulsion 466 pbw of a 40.8% acrylamide, 22 pbw acrylic acid, 12 pbw of 50% by weight sodium hydroxide and 5 pbw ammonium hydroxide were mixed together. The pH of the solution was 5.8. This solution was added slowly with rapid agitation at room temperature to a solution of 47 pbw polyoxyethylene oleyl ether in 188 pbw kerosene. The resulting emulsion was transferred to a polymerization vessel and sparged for one hour with nitrogen. Then 0.43 pbw of 2,2'-azo(bis)isobutyronitrile in 2.6 pbw acetone was added and the emulsion was heated to 40° C. After two hours at 40° C., the mixture was heated to 45° C. and the exotherm was controlled with cooling to reach a maximum temperature of 50°–55° C. Then 28 pbw of ethoxylated nonyl phenol was added and stirred until uniform. This was followed by the addition of 50 pbw water and 50 pbw kerosene with good mixing. A sample of the resulting reaction product inverted instantly when added to water to form an anionic aqueous solution.

EXAMPLE V

Anionic Copolymer Water-In-Oil Emulsion 497 pbw of a 35% acrylamide, 76 pbw acrylic acid, 75 pbw of 50% by weight sodium hydroxide and 0.16 m mole persulfate were mixed together. The pH of the mixture was 6. This was added slowly under rapid agitation to a solution of 34 pbw mixture of sorbitan monooleate/Polysorbate 80 in 250 pbw kerosene at room temperature. The resulting emulsion was homogenized and transferred to a polymerization vessel. After sparging for one hour with nitrogen, a total of 0.2 m mole sodium metabisulfite was added over two-three hours, maintaining a reaction temperature between 35°–40° C. At the end of this period the polymerization was complete. 36 pbw of ethoxylated nonyl phenol was added and the reaction mixture was agitated for an additional one-half hour. A sample of the resulting mixture when added to a large amount of water inverted instantly forming a thick anionic polymer aqueous solution.

EXAMPLE VI

Low Pour Point Polymeric Water-In-Oil Emulsions

The following Table shows quantities of emulsion, diols and triols and pour point depressant used in self-inverting polymeric water-in-oil emulsions having low pour point temperatures.

Each emulsion was prepared by first mixing the indicated quantities of pour point depressant and the emulsion and then adding the indicated amount of premixed diols/triols to the emulsion to obtain a uniform product. The emulsions were then placed in a freezer at −15° C. (+5° F.). Fluidity of the emulsions were monitored at regular intervals. The freezer test now closely simulates the environment that these emulsions will be subjected to in actual use. This test is more stringent as the emulsion are left at subfreezing temperatures for a prolonged period of time (equivalent to having the drums/tank wagons of these products standing for a prolonged period of time in the field at subfreezing temperatures). The initial slow cooling rate (from room temperature to −15° C.) and prolonged exposure eliminates following a particular temperature sequence and cooling rate used in the ASTM D97-66 test. Variations in the temperature sequence and/or cooling rate can result in higher or lower values for the pour point. It also eliminates shock cooling in the ASTM test.

TABLE

| Preparation | Ingredients | Fluidity # of Days at −15° C. |
|---|---|---|
| No. 1 | 100 pbw Example I emulsion | Frozen Overnight |
| No. 2 | 85 pbw Example I emulsion 0.1 pbw Paraflow 349 15 pbw diol/triol mixture* | ≧45 Days |
| No. 3 | 100 pbw Example II emulsion | Frozen Overnight |
| No. 4 | 90 pbw Example II emulsion 0.1 pbw Paraflow 349 10 pbw diol/triol mixture* | ≧45 Days |
| No. 5 | 85 pbw Example II emulsion 0.1 pbw Paraflow 349 15 pbw diol/triol mixture* | ≧45 Days |
| No. 6 | 100 pbw Example III emulsion | Frozen Overnight |
| No. 7 | 95 pbw Example III 0.1 pbw Paraflow 349 5 pbw mixed diol/triol* | 3 Days |
| No. 8 | 90 pbw Example III emulsion 0.1 pbw Paraflow 349 10 pbw mixed driol/triol* | ≧45 Days |
| No. 9 | 85 pbw Example III emulsion 0.1 pbw Paraflow 349 15 pbw mixed diol/triol* | ≧45 Days |
| No. 10 | 100 pbw Example IV emulsion | Frozen Overnight |
| No. 11 | 85 pbw Example IV emulsion 0.1 pbw Paraflow 349 15 pbw mixed diol/triol* | ≧180 Days |
| No. 12 | 100 pbw Example V emulsion | ≧45 Days |
| No. 13 | 95 pbw Example V emulsion 0.1 pbw Paraflow 349 5 pbw mixed diol/triol* | ≧45 Days |
| No. 14 | 90 pbw Example V emulsion 0.1 pbw Paraflow 349 10 pbw mixed diol/triol* | ≧45 Days |
| No. 15 | 85 pbw Example V emulsion 0.1 pbw Paraflow 349 15 pbw mixed diol/triol* | ≧45 Days |

*equal pbw of ethylene glycol, diethylene glycol and glycerine.

While the invention has been described with reference to certain specific embodiments thereof, it is understood that it is not to be so limited since alterations and changes may be made therein which are within the full intended scope of the appended claims.

What is claimed is:

1. In a self-inverting polymer water-in-oil emulsion, the improvement comprising addition of effective amounts of (a) pour point depressant, (b) diol and (c) triol to depress pour point of the emulsion, to provide fluidity at about −15° C. and to inhibit skin formation on surface of the emulsion at low temperatures of from about −5° to about −50° C.

2. The emulsion of claim 1 wherein
   (a) the pour point depressant is selected from the group consisting of
      (1) vinyl ester polymer and copolymer,
      (2) vinyl acetate copolymer and fatty acrylate homopolymer,
      (3) vinyl ester copolymer and ethylene-alpha-olefin copolymer,
      (4) vinyl acetate-alkyl fumarate copolymer,
      (5) alkyl methacrylate polymer and copolymer, and
      (6) alkylated polystyrene,
   (b) the diol is selected from the group consisting of
      (1) glycols
      (2) ethers of glycols, and
      (3) mixtures thereof; and
   (c) the triol is selected from the group consisting of
      (1) trihydric alcohols
      (2) ethers of trihydric alcohols, and
      (3) mixtures thereof.

3. The emulsion of claim 1 wherein there is present (a) from about 0.05 to about 0.5 parts by weight of pour point depressant per 1.0 to 100.0 parts by weight of polymer emulsion; (b) from about 5.0 to about 100.0 parts by weight of diol per 1.0 to 100.0 parts by weight of polymer emulsion and (c) from about 5.0 to about 100.0 parts by weight of triol per 1.0 to 100.0 parts by weight of polymer emulsion.

4. The emulsion of claim 1 wherein there is present in the emulsion from about 10.0 to about 50.0% by weight of polymer and from about 10.0 to about 40.0% by weight of oil.

5. The emulsion of claim 1 wherein the self-inverting emulsion is selected from the group consisting of
   water-in-oil nonionic polymer emulsion,
   water-in-oil cationic polymer emulsion,
   water-in-oil anionic copolymer emulsion, water-in-oil anionic hydrolyzed polymer emulsion, and water-in-oil amphoteric polymer emulsion.

6. The emulsion of claim 1 wherein the pour point depressant is an ethylene based polymer.

7. The emulsion of claim 1 wherein the pour point depressant is a hydrocarbon wax-naphthalene condensate.

8. The emulsion of claim 1 wherein the pour point depressant is selected from the group consisting of alkyl methacrylate polymer and copolymer thereof, olefin polymer and copolymer thereof, vinyl ester polymer and copolymer thereof, and alkylated polystyrene.

9. The emulsion of claim 1 wherein the diol is selected from the group consisting of a glycol, glycol ether and mixture thereof, wherein the glycol has from 2 to 6 carbon atoms.

10. A process for preparing the emulsion of claim 1 comprising (1) mixing (a) from about 0.05 to about 0.5 parts by weight of pour point depressant; (b) from about 5.0 parts by weight to about 100.0 parts by weight of diol and (c) from about 5.0 parts by weight to about 100.0 parts by weight of triol to obtain a uniform mixture and (2) blending the pour point depressant, diol and triol mixture from (1) with 1.0 to 100.0 parts by weight of a polymeric self-inverting water-in-oil emulsion to obtain emulsion having a low pour point temperature.

11. The emulsion of claim 1 wherein the pour point depressant is vinyl ester polymer and copolymer.

* * * * *